(12) United States Patent
Tam

(10) Patent No.: US 6,957,245 B2
(45) Date of Patent: Oct. 18, 2005

(54) ULTRA-FAST ADDER

(75) Inventor: Honkai Tam, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 519 days.

(21) Appl. No.: 10/066,384

(22) Filed: Jan. 31, 2002

(65) Prior Publication Data

US 2003/0145034 A1 Jul. 31, 2003

(51) Int. Cl.[7] .............................................. G06F 7/50
(52) U.S. Cl. ...................................................... 708/712
(58) Field of Search ................................. 708/710–713

(56) References Cited

U.S. PATENT DOCUMENTS 5,898,596 A * 4/1999 Ruetz .......................... 708/710
6,175,852 B1 * 1/2001 Dhong et al. ................ 708/712
6,742,014 B2 * 5/2004 Bradley ....................... 708/712

* cited by examiner

*Primary Examiner*—Tan V. Mai
(74) *Attorney, Agent, or Firm*—Martine Penilla & Gencarella, LLP

(57) ABSTRACT

A carry look-ahead adder capable of adding or subtracting two input signals includes first stage logic having a plurality of carry-create and carry-transmit logic circuits each coupled to receive one or more bits of each input signal. Each carry-create circuit generates a novel carry-create signal in response to corresponding first bit-pairings of the input signals, and each carry-transmit circuit generates a novel carry-transmit signal in response to corresponding second bit-pairings of the input signals. The carry-create and carry-transmit signals are combined in carry look-ahead logic to generate accumulated carry-create signals, which are then used to select final sum bits.

26 Claims, 11 Drawing Sheets

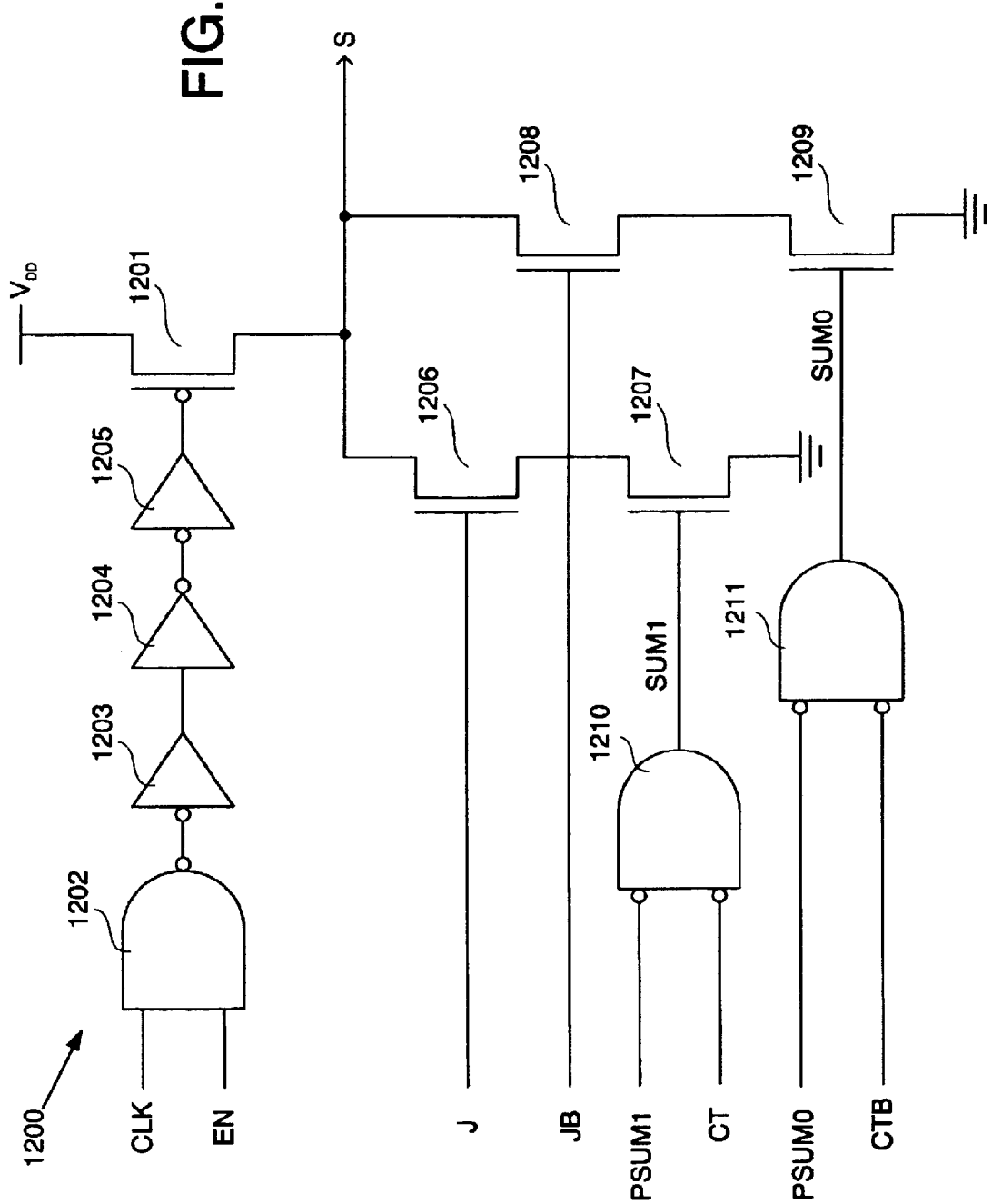

ULTRA-FAST ADDER

BACKGROUND

1. Field of Invention

This invention relates generally to digital logic and specifically to carry-look ahead adders.

2. Description of Related Art

FIG. 1 is a block diagram of a conventional 12-bit carry look-ahead adder 100 having three processing stages in which input signals A[11:0] and B[11:0] are logically combined to generate a 12-bit sum signal S[11:0] and a carry-out bit $C_{out}$. In the first stage, groups of three input signal pairs are combined in conventional 3-bit propagate circuits (P3) 200 and 3-bit generate circuits (G3) 300 to produce well-known carry-propagate P[z→x] and carry-generate signals G[z→x], respectively. Specifically, each carry-propagate circuit 200 logically combines three bit-pairings of the input signals A[z:x] and B[z:x] to generate its carry-propagate signal P[z→x] according to the well-known logical expression P[z→x]=(Ax+Bx)|(Ay+By)|(Az+Bz), where | denotes the logical AND operation and + denotes the logical OR operation. The groups of three bit-pairings A[z:x] and B[z:x] are also logically combined in G3 circuits 300, each of which generates its carry-generate signal G[z→x] according to the well-known logical expression G[z→x]=Az|Bz+(Az+Bz)|(Ay|By+(Ay+By)|(Ax|Bx)].

In order to maximize speed, P3 circuits 200 and G3 circuits 300 are typically implemented using dynamic logic as shown, for example, in FIGS. 2 and 3, respectively, where PMOS pull-up transistor MP1 and NMOS pull-down transistor MN1 are each responsive to a clock signal CLK. Thus, when CLK is logic low, transistor MP1 turns on and pulls node N1 high to $V_{DD}$ to set the output signal (e.g., P[z→x] or G[z→x]) to logic low via inverter INV1, and transistor MN1 turns off to isolate node N2 from ground potential. When CLK transitions to logic high, transistor MP1 turns off and transistor MN1 turns on, thereby allowing input signals A[z:x] and B[z:x] to determine the logic state of the output signal P[z→x] or G[z→x]. When CLK transitions back to logic low, the output signal is again returned to logic low via inverter INV1 and pull-up transistor MP1.

The second stage of adder 100 includes well-known carry look-ahead (CLA) logic 400 that combines the carry-generate and carry-propagate signals provided by the first stage to simultaneously produce accumulated carry information at 3-bit intervals. Specifically, the carry-generate and carry-propagate signals from respective G3 circuits 300 and P3 circuits 200 are provided to and logically combined in carry look-ahead (CLA) logic 400 to simultaneously produce accumulated carry-generate signals G[2→0], G[5→0], G[8→0], and G[11→0], where G[2→0] represents the carry-out from the first 3 bit positions 0 to 2, G[5→0] represents the carry-out from the first 6 bit positions 0 to 5, G[8→0] represents the carry-out from the first 9 bit positions 0 to 8, and G[11→0] represents the carry-out from all 12 bit positions, and therefore also provides the carry-out bit $C_{out}$ for adder 100.

CLA logic 400 includes well-known CLA blocks 410, 420, and 430, and in response to the carry-generate G[z→x] and carry-propagate P[z→x] signals, generates in parallel the accumulated carry-generate signals G[2→0], G[5→0], G[8→0], and G[11→0], respectively. G[2→0] is generated by G3 circuit 300a, and may pass unmodified through CLA logic 400. CLA block 410 generates G[5→0] according to the logical expression G[5→0]=G[5→3]+P[5→3]|G[2→0]. CLA block 420 generates G[8→0] according to the logical expression G[8→0]=G[8→6]+P[8→6]|G[5→3]+P[8→6]|P[5→3]|G[2→0]. CLA block 430 generates G[11→0] according to the logical expression G[11→0]=G[11→9]+P[11→9]|G[8→6]+P[11→9]|P[8→6]|G[5→3]+P[11→9]|P[8→6]|P[5→3]|G[2→0]. Exemplary circuit diagrams for CLA blocks 410, 420, and 430 implemented in dynamic logic are shown in FIGS. 4A, 4B, and 4C, respectively.

The third stage of adder 100 includes conventional sum circuits 500 that together logically combine the accumulated carry information provided by the second stage CLA logic 400 with the input signals A[11:0] and B[11:0] to generate the sum signal S[11:0]. Specifically, a grounded signal $C_{in}$ and the accumulated carry-generate signals G[2→0], G[5→0], and G[8→0] are provided as carry-in signals to respective sum circuits 500a–500d to generate corresponding 3-bit groups of the sum signal in a well-known manner. For example, sum circuit 500a combines A[2:0], B[2:0], and a grounded (i.e., logic low) carry-in bit $C_{in}$ to generate sum bits S[2:0], sum circuit 500b combines A[5:3], B[5:3], and carry-in bit G[2→0] to generate sum bits S[5:3], sum circuit 500c combines A[8:6], B[8:6], and carry-in bit G[5→3] to generate sum bits S[8:6], and sum circuit 500d combines A[11:9], B[11:9], and carry-in bit G[8→6] to generate sum bits S[11:9].

Typically, each sum circuit 500 generates well-known sum0 and sum1 signals in response to the input signals A and B, and uses the carry-in bit (e.g., G[z→x]) to select between outputting either the sum0 or sum1 bits to form the sum signal S. For example, FIG. 5 shows a conventional 3-bit sum circuit 500 including 3-bit carry-ripple adders. Three sum0 bits are generated by full adders 502a–502c in response to logical combinations of Ax and Bx, Ay and By, and Az and Bz, respectively, with a logic low (i.e., grounded) carry-in bit $C_{in}$, and three sum1 bits are generated by full adders 504a–504c in response to logical combinations of Ax and Bx, Ay and By, and Az and Bz, respectively, with a logic high (i.e., tied to $V_{DD}$) carry-in bit $C_{in}$. Multiplexers 506a–506c selectively output either the sum0 or sum1 bits as respective sum bits Sx, Sy, and Sz in response to the logic state of the corresponding carry signal G[u→w]. Because the sum0 and sum1 bits are generated before G[u→w] is available, the 3-bit carry-ripple adders of sum circuit 500 do not degrade performance of adder 100.

Although CLA adder 100 is much faster than carry-ripple adders, it would nevertheless be desirable to further improve its performance. For example, referring again to FIG. 2, P3 circuit 200 includes two paths of three transistors connected in series between nodes N1 and N2 (i.e., transistors 201–203 and transistors 204–206), and thus has a stack height of three. Referring to FIG. 3, G3 circuit 300 includes a discharge path having four stacked input transistors 306–309 connected in series between nodes N1 and N2, and thus has a stack height of four. Because of the well-known body effect phenomenon, the addition of each stacked input transistor significantly reduces the switching speed of the corresponding logic circuit. As a result, because G3 circuit 300 has a stack height of four and P3 circuit 200 has a stack height of three, G3 circuit 300 is much slower than P3 circuit 200, and therefore determines the critical path of the adder 100. Accordingly, it would be desirable to reduce the stack heights of the first stage logic circuits 200 and 300 in order to increase performance.

In addition, G3 circuit 300 includes one discharge path having four stacked input transistors 306–309 and another discharge path having only two stacked input transistors 301–302. Since the series resistance of the four transistors 306–309 is much greater than the series resistance of the two transistors 301–302, transistors 306–309 are typically sized to be much larger than transistors 301–302 in order to maintain similar speeds for their respective discharge paths. However, increasing the size of transistors 306–309 in an effort to achieve balanced operation also increases parasitic capacitances, which in turn further reduces the speed of G3 circuit 300. Increasing the size of transistors 306–309 also increases the input capacitance of circuit 300, which in turn undesirably loads circuitry (not shown) that provides input signals to circuit 300. Thus, it would also be desirable for an adder's first stage logic circuits to have better-balanced discharge paths.

SUMMARY

A method and apparatus are disclosed that increase the speed of carry look-ahead (CLA) adders by reducing the stack height of their first stage logic circuits. In accordance with the present invention, a CLA adder capable of adding (or subtracting) two input signals includes first stage logic having a plurality of carry-create and carry-transmit logic circuits each coupled to receive one or more bits of each input signal. Each carry-create circuit generates a novel carry-create signal in response to corresponding first bit-pairings of the input signals, and each carry-transmit circuit generates a novel carry-transmit signal in response to corresponding second bit-pairings of the input signals. The carry-create and carry-transmit signals are combined in CLA logic to generate accumulated carry-create signals, which are then used to select final sum bits.

For one embodiment, each carry-create circuit is coupled to receive 3 bit-pairings of input signals A and B, and generates a corresponding carry-create signal according to the logical expression $J[z \rightarrow x] = (Az|Bz) + (Ay|By) + (Ax|Bx)$, where | represents the logical AND operation, + indicates the logical OR operation, and x, y, and z represent bit positions in the input signals A and B. The carry-create circuit implements three 2-input AND terms, and thus has a stack height of two. Each carry-transmit circuit is coupled to receive 3 bit-pairings of input signals A and B, and generates a corresponding carry-transmit signal according to the logical expression $T[z \rightarrow x] = (Az + Bz)|[(Ay + By)|(Ax + Bx) + (Ax + Bx)]$. The carry-transmit circuit implements a 3-input AND term, and thus has a stack height of three. By comparison, prior art carry-propagate and carry-generate circuits have stack heights of three and four, respectively. Thus, because the first stage carry-create and carry-transmit circuits of the present invention have lower stack heights than do prior art first stage carry-propagate and carry-generate circuits, adders that incorporate Applicant's first stage carry-create and carry-transmit circuits are faster than prior art adders that utilize conventional carry-propagate and carry-generate circuits.

In addition, Applicant's carry-create and carry-transmit logic circuits have evenly balanced discharge paths. For one embodiment, each discharge path in the carry-create logic circuit includes two stacked input transistors, and each discharge path in the carry-transit logic circuit includes three stacked input transistors. As a result, Applicant's carry-create and carry-transmit logic circuits do not require transistor sizing adjustments to maintain balanced operation, which may result in an even greater performance advantage over prior art CLA adders.

BRIEF DESCRIPTION OF THE DRAWINGS

The features and advantages of the present invention are illustrated by way of example and are by no means intended to limit the scope of the present invention to the particular embodiments shown, and in which:

FIG. 12 is a circuit diagram of one embodiment of the sum generator of FIG. 11.

Like reference numerals refer to corresponding parts throughout the drawing figures.

DETAILED DESCRIPTION

Present embodiments are discussed below in the context of a 12-bit adder 100 for simplicity only. It is to be understood that present embodiments are equally applicable to adders that combine input signals of other various bit lengths. Further, although described below in the context of dynamic logic, embodiments of the present invention may be implemented in static logic. Also, the specific configurations of logic circuits disclosed for implementing various logical expressions described in accordance with the present invention may be modified as desired. In addition, adders of the present invention may be readily used to perform arithmetic subtraction operations. Accordingly, the present invention is not to be construed as limited to specific examples described herein but rather includes within its scope all embodiments defined by the appended claims.

Figure 6:
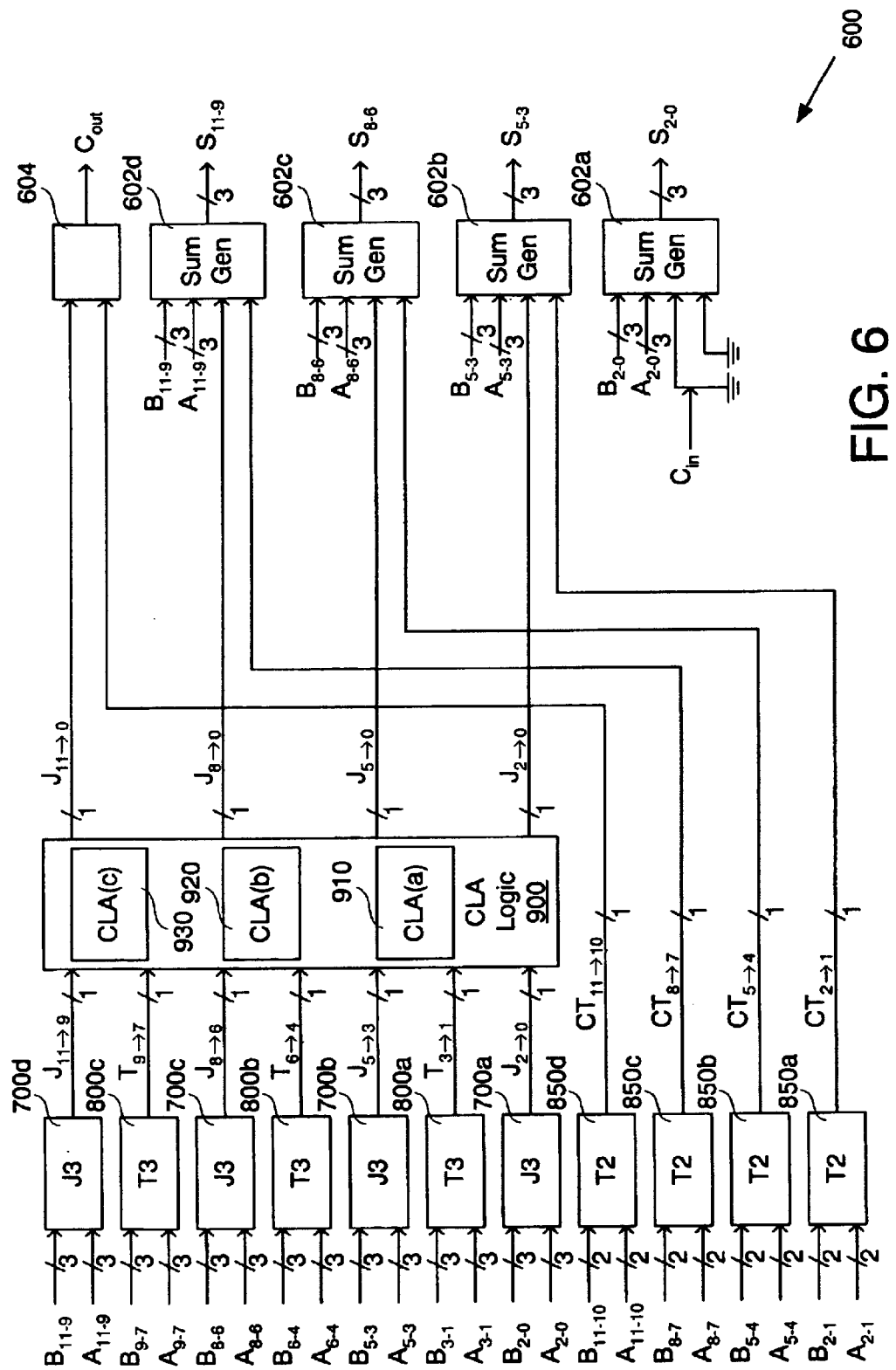
FIG. 6 is a block diagram of a 12-bit carry look-ahead adder that produces carry information at 3-bit intervals in accordance with the present invention.

FIG. 6 is a block diagram of one embodiment of a 12-bit bit carry look-ahead (CLA) adder 600 in accordance with the present invention. Adder 600 is shown in FIG. 6 and described herein as logically combining first and second 12-bit input signals A[11:0] and B[11:0] to produce a 12-bit sum signal S[11:0] and a carry-out bit $C_{out}$. The carry-in bit $C_{in}$ to adder 600 is tied to ground potential to indicate that there is no carry-in bit. Adder 600 includes three stages of processing. The first stage includes four 3-bit carry-create (J3) circuits 700a–d, three 3-bit carry-transmit (T3) circuits 800a–c, and four 2-bit carry translation (T2) circuits 850a–850d. The second stage includes CLA logic 900. The third stage includes four 3-bit sum generators 602a–602d and a logic gate 604.

T2 circuits 850 and T3 circuits 800 are shown as separate logic elements in the block diagram of FIG. 6 for clarity only. As explained below, T3 circuits 800 and T2 circuits 850 include similar logic. Thus, in some embodiments, T2 circuits 850a–850c may be incorporated within T3 circuits 800a–800c, respectively, in order to eliminate duplicative logic and thereby reduce overall transistor count, which in turn advantageously reduces both silicon area and power consumption.

Figure 1:
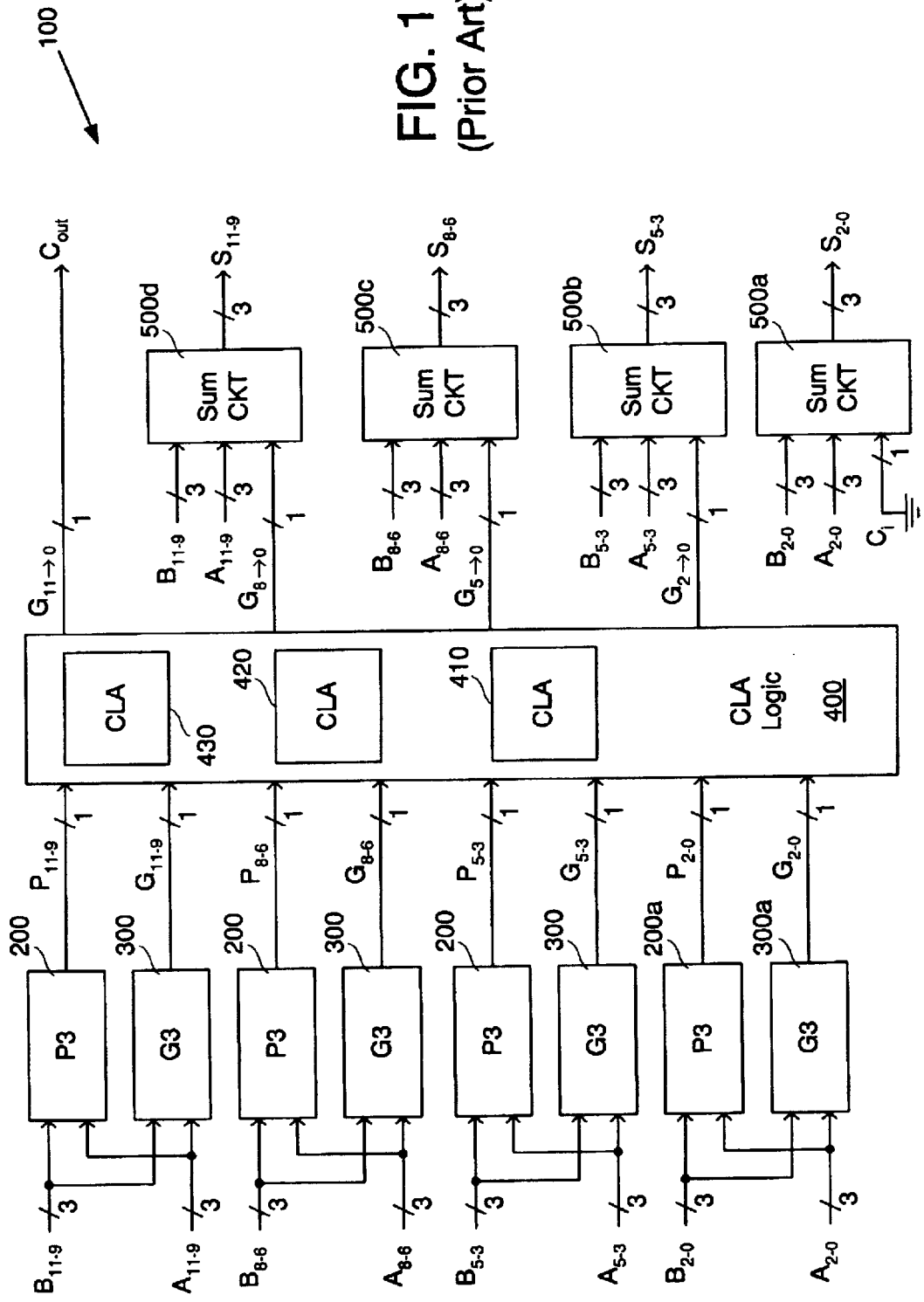
FIG. 1 is a block diagram of a conventional 12-bit carry look-ahead adder that produces carry information at 3-bit intervals.

In accordance with the present invention, the first stage J3 circuits 700 and T3 circuits 800 generate a plurality of carry-create signals J and carry-transmit signals T, respectively, using the input signals A and B in a novel manner that improves performance compared to the generation of conventional first stage carry-generate and carry-propagate signals used, for example, in the prior art adder 100 of FIG. 1. T2 circuits 850 generate carry translation signals CT using the input signals A and B. The second stage CLA logic 900 logically combines the carry-create and carry-transmit signals to produce a number of accumulated carry-create signals that represent carry information at 3-bit intervals. For one embodiment, the second stage CLA logic 900 is conventional. The third stage sum generators 602 combine input signals A and B with the accumulated carry-create signals J and carry translation signals CT to produce the sum signal S.

Figure 7:
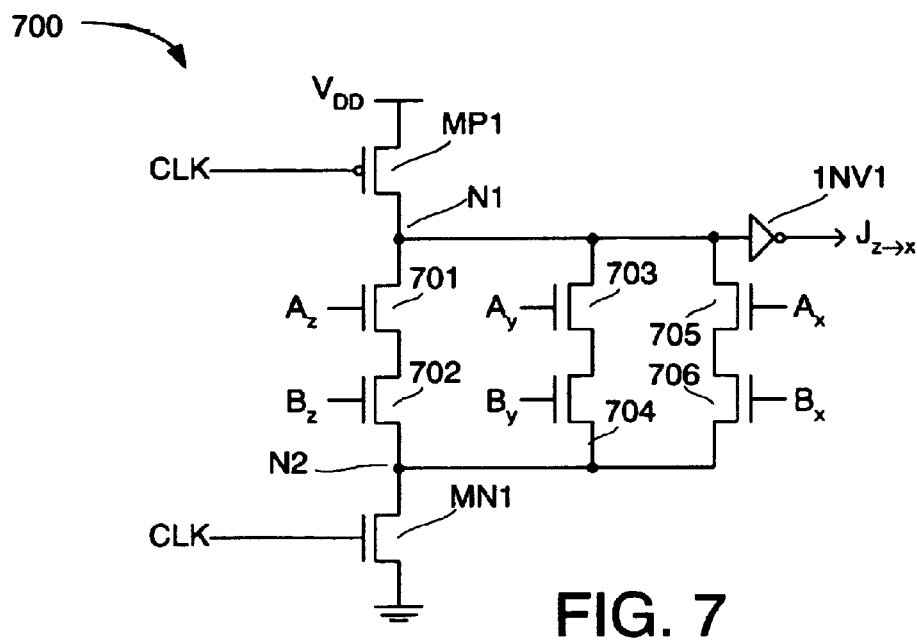
FIG. 7 is a circuit diagram of one embodiment of a 3-bit carry-create circuit of the adder of FIG. 6.

Specifically, first groups of three bit-pairings of the input signals are logically combined in J3 circuits 700 to generate carry-create signals J[2→0], J[5→3], J[8→6], and J[11→9]. For example, input signal bits A[2:0] and B[2:0] are combined in J3 circuit 700a to generate J[2→0], input signal bits A[5:3] and B[5:3] are combined in J3 circuit 700b to generate J[5→3], input signal bits A[8:6] and B[8:6] are combined in J3 circuit 700c to generate J[8→6], and input signal bits A[11:9] and B[11:9] are combined in J3 circuit 700d to generate J[11→9]. Each J3 circuit 700 generates its carry-create signal J according to the logical expression J[z→x]=(Az|Bz)+(Ay|By)+(Ax|Bx), where | represents the logical AND operation, + indicates the logical OR operation, and x, y, and z represent bit positions in the input signals A and B. A circuit diagram of one embodiment of J3 circuit 700 implemented in dynamic logic is shown in FIG. 7.

Figure 8:
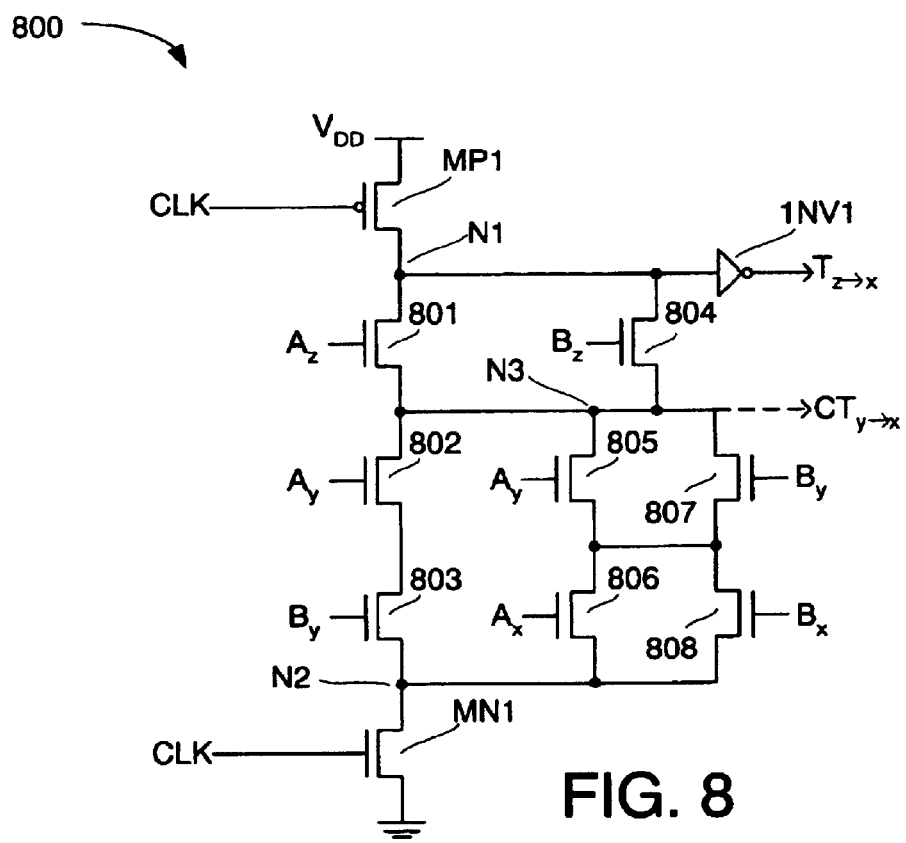
FIG. 8 is a circuit diagram of one embodiment of a 3-bit carry-transmit circuit of the adder of FIG. 6.

Second groups of three bit-pairings of the input signals are logically combined in T3 circuits 800 to produce carry-transmit signals T[3→1], T[6→4], and J[9→7]. For example, input signal bits A[3:1] and B[3:1] are combined in T3 circuit 800a to generate T[3→1], input signal bits A[6:4] and B[6:4] are combined in T3 circuit 800b to generate T[6→4], and input signal bits A[9:7] and B[9:7] are combined in T3 circuit 800c to generate T[9→7]. Each carry-transmit circuit 800 generates its carry-transmit signal T according to the logical expression T[z→x]=(Az+Bz)|[(Ay+By)|(Ax+Bx)+(Ay|By)]. A circuit diagram of one embodiment of T3 circuit 800 implemented in dynamic logic is shown in FIG. 8.

Note that the first groups of input signal bit-pairings (which are combined in J3 circuits 700) are different from the second groups of input signal bit-pairings (which are combined in T3 circuits 800). For example, while the first groups of bit-pairings respectively include bits 0–2, 3–5, 6–8, and 9–11, the second groups of bit-pairings respectively include bits 1–3, 4–6, and 7–9.

Figure 9:
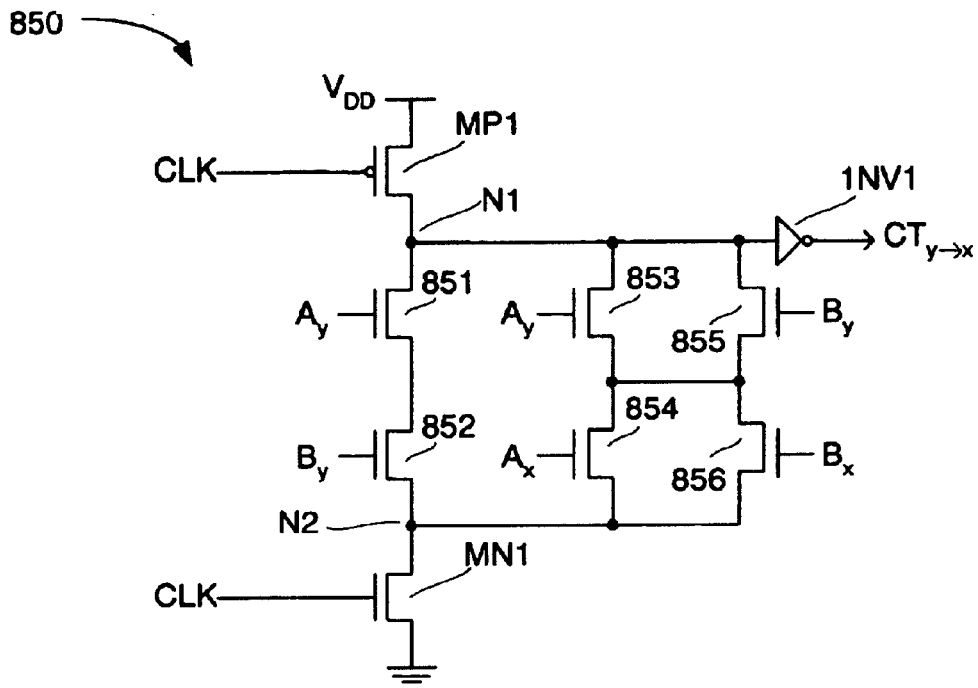
FIG. 9 is a circuit diagram of one embodiment of a carry translation circuit of the adder of FIG. 6.

Third groups of two bit-pairings of the input signals are logically combined in T2 circuits 850 to produce carry translation signals CT[2→1], CT[5→4], CT[8→7], and CT[11→10]. For example, input signal bits A[2:1] and B[2:1] are combined in T2 circuit 850a to generate carry translation signal CT[2→1], input signal bits A[5:4] and B[5:4] are combined in T2 circuit 850b to generate carry translation signal CT[5→4], input signal bits A[8:7] and B[8:7] are combined in T2 circuit 850c to generate carry translation signal CT[8→7], and input signal bits A[11:10] and B[11:10] are combined in T2 circuit 850d to generate carry translation signal CT[11→10]. Each T2 circuit 850 generates its carry translation signal CT according to the logical expression CT[y→x]=(Ay+By)|(Ax+Bx)+Ay|By. A circuit diagram of one embodiment of a dynamic logic implementation of T2 circuit 850 is shown in FIG. 9.

As mentioned above, T2 circuits 850 share common logic with T3 circuits 800, and therefore may be incorporated into T3 circuits 800. Referring also to FIG. 8, transistors 802–803, 805–806, and 807–808 of T3 circuit 800 perform the identical logic function as transistors 851–852, 853–854, and 855–856 of T2 circuit 850, and therefore the signal CT[y→x] may be taken at node N3 of T3 circuit 800 rather than being generated in a separate T2 circuit 850. Thus, referring again to FIG. 6, T3 circuit 800a may provide CT[2→1], T3 circuit 800b may provide CT[5→4], and T3 circuit 800c may provide CT[8→7]. In this manner, T2 circuits 850a–850c may be eliminated from the embodiment of FIG. 6.

The carry-create signals J and carry-transmit signals T produced by respective J3 circuits 700 and P3 circuits 800 are provided to and combined in second stage carry look-ahead (CLA) logic 900 to simultaneously produce accumulated carry-create signals at 3-bit intervals, i.e., J[2→0], J[5→0], J[8→0], and J[11→0], where J[2→0] represents carry information for the first 3 input signal bit-pairings 0 to 2, J[5→0] represents carry information for the first 6 input signal bit-pairings 0 to 5, J[8→0] represents carry information for the first 9 input signal bit-pairing 0 to 8, and J[11→0] represents carry information for all 12 input signal bit-pairings.

CLA logic 900 includes CLA blocks 910, 920, and 930, and operates to simultaneously generate the accumulated carry-create signals J[2→0], J[5→0], J[8→0], and J[11→0] in response to the carry-create and carry-transmit signals provided by first stage J3 circuits 700 and T3 circuits 800. For one embodiment, accumulated carry-create signal J[2→0], which is generated by J3 circuit 700a, may pass unmodified through CLA logic 900. In other embodiments, CLA logic 900 may generate J[2→0] internally.

Figure 10A:
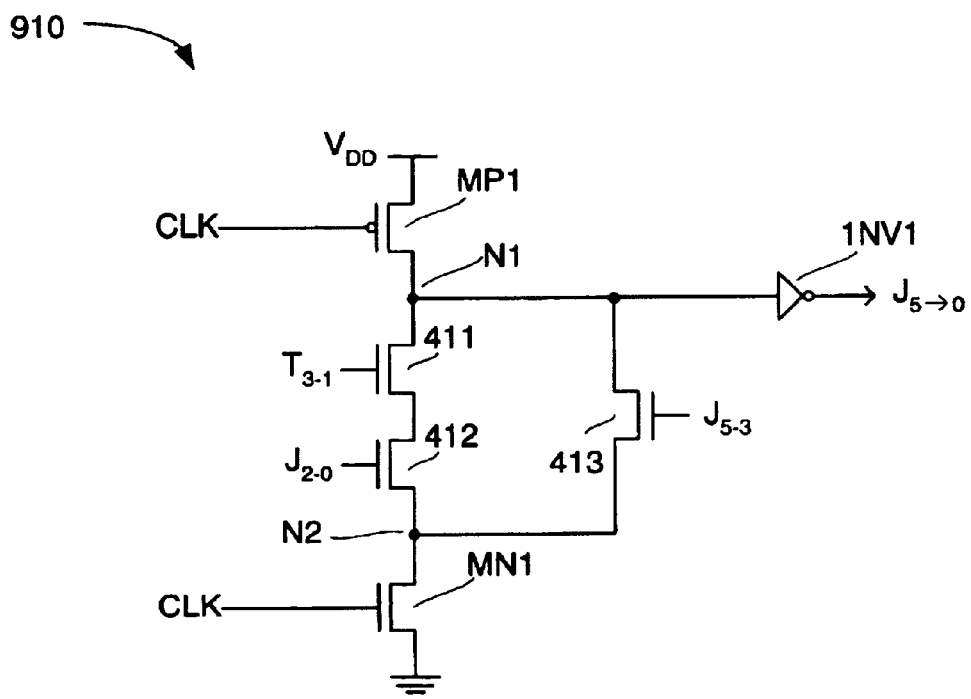
FIGS. 10A–10C are circuit diagrams of one embodiment of CLA blocks of the adder of FIG. 6.

CLA block 910 logically combines J[2→0], J[5→3], and T[3→1] to generate J[5→0] according to the logical expression J[5→0]=J[5→3]+T[3→1]|J[2→0]. For some embodiments, CLA block 910 may be conventional CLA block 410 used in the prior art adder 100 of FIG. 1. A circuit diagram of one embodiment of a dynamic logic implementation of CLA block 910 is shown in FIG. 10A.

Figure 10B:
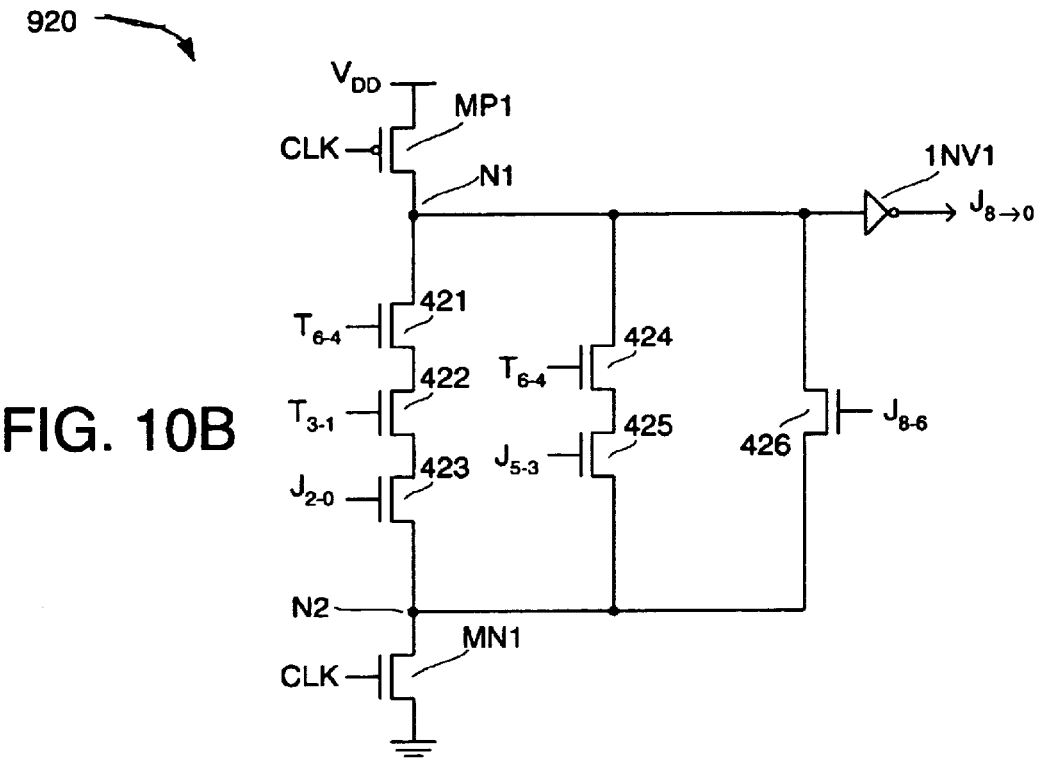

CLA block 920 logically combines J[2→0], J[5→3], J[8→7], T[3→1], and T[6→4] to generate signal J[8→0] according to the logical expression J[8→0]=J[8→6]+T[6→4]|J[5→3]+T[6→4]|T[3→1]|J[2→0]. For some embodiments, CLA block 920 may be conventional CLA block 420 used in the prior art adder 100 of FIG. 1. A circuit diagram of one embodiment of a dynamic logic implementation of CLA block 920 is shown in FIG. 10B.

Figure 10C:
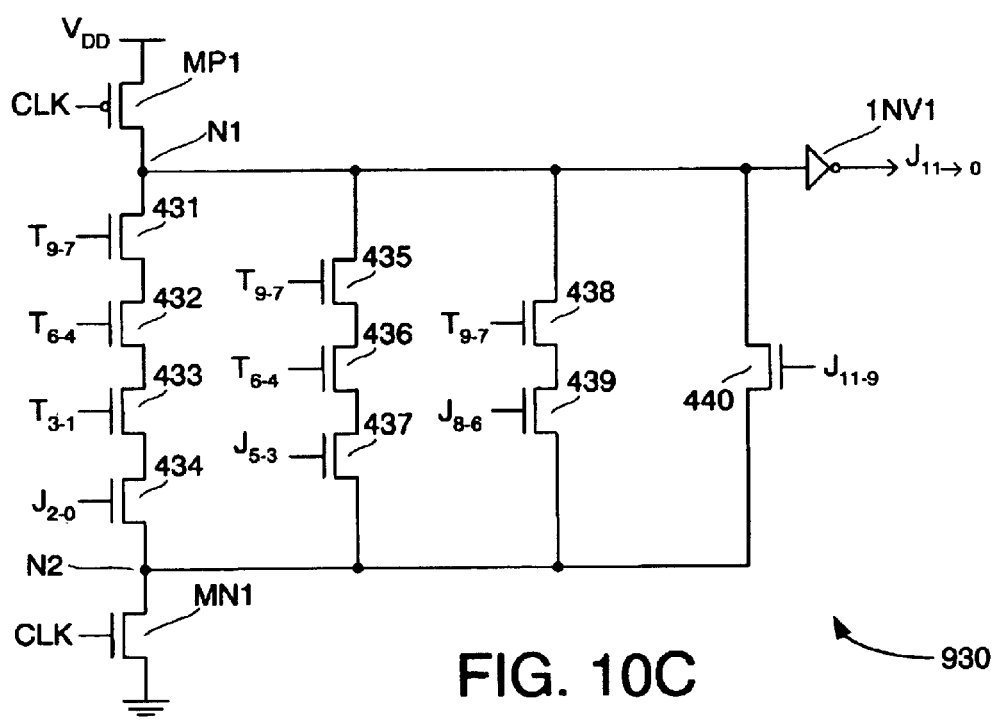

CLA block 930 logically combines J[2→0], J[5→3], J[8→7], J[11→9], T[3→1], T[6→4], and T[9→7] to generate signal J[11→0] according to the logical expression J[11→0]=J[11→9]+T[9→7]|J[8→6]+T[9→7]|T[6→4]|J[5→3]+T[9→7]|T[6→4]|T[3→1]|J[2→0]. A circuit diagram of one embodiment of a dynamic logic implementation of CLA block 930 is shown in FIG. 10C.

The third stage sum generators 602 logically combine three corresponding bit-pairings of the input signals A[z:x]

and B[z:x] with corresponding accumulated-carry signals J[z→x] and carry translation signals CT[y→x] to generate the bits of the sum signal. For example, sum generator 602a logically combines A[2:0] and B[2:0] (with grounded carry information) to generate sum bits S[2:0], sum generator 602b logically combines A[5:3] and B[5:3] with carry information indicated by J[2→0] and CT[2→1] to generate sum bits S[5:3], sum generator 602c logically combines A[8:6] and B[8:6] with carry information indicated by J[5→0] and CT[5→4] to generate sum bits S[8:6], and sum circuit 602d logically combines A[11:9] and B[11:9] with carry information indicated by J[8→0] and CT[8→7] to generate sum bits S[11:9]. Signals J[11→0] and CT[11→10] are logically combined in logic gate 604 to generate the carry-out bit $C_{out}$. For one embodiment, logic gate 604 is a well-known AND gate.

Figure 5:
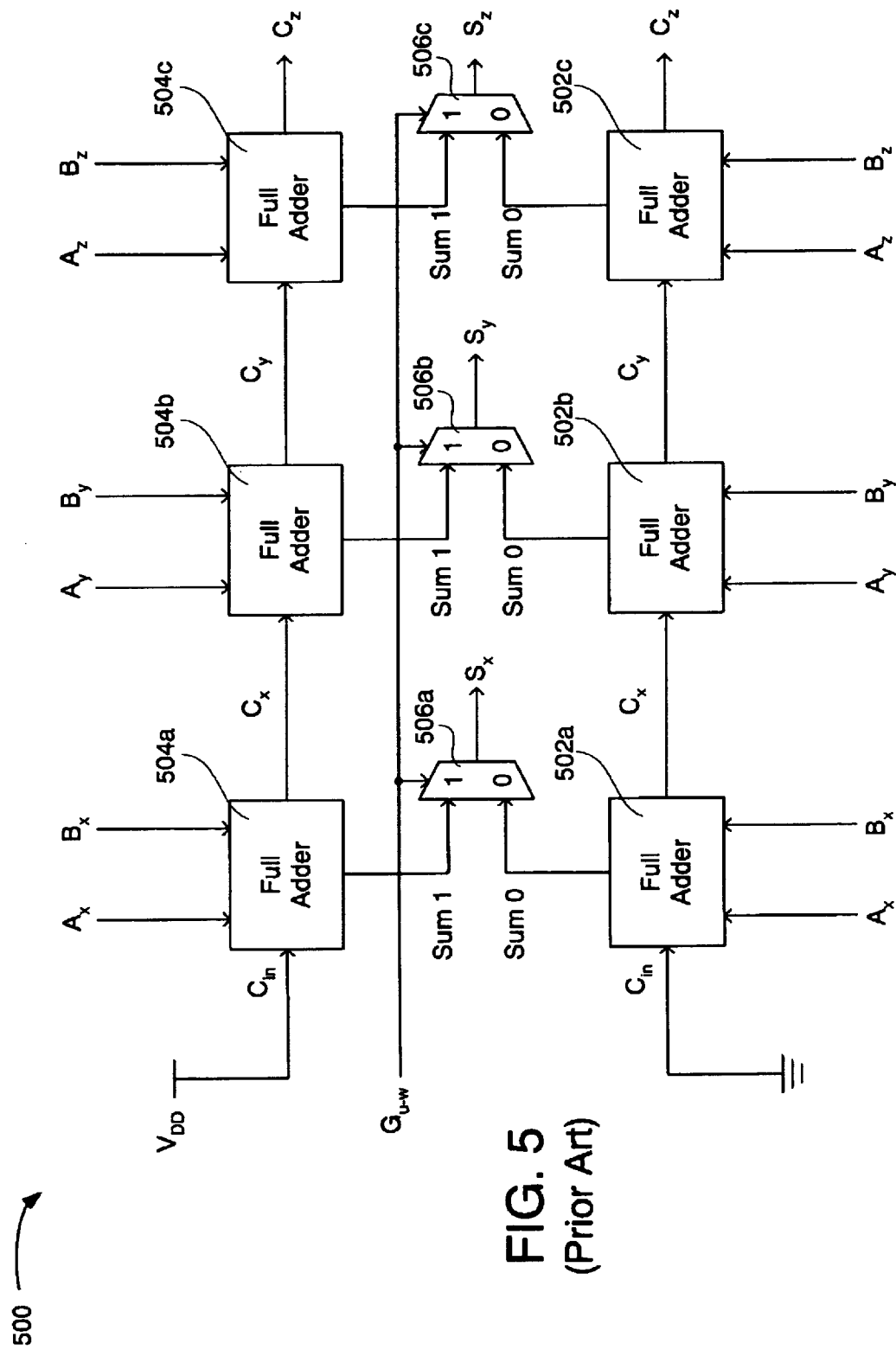
FIG. 5 is a block diagram of a conventional sum circuit of the adder of FIG. 1.
Figure 11:
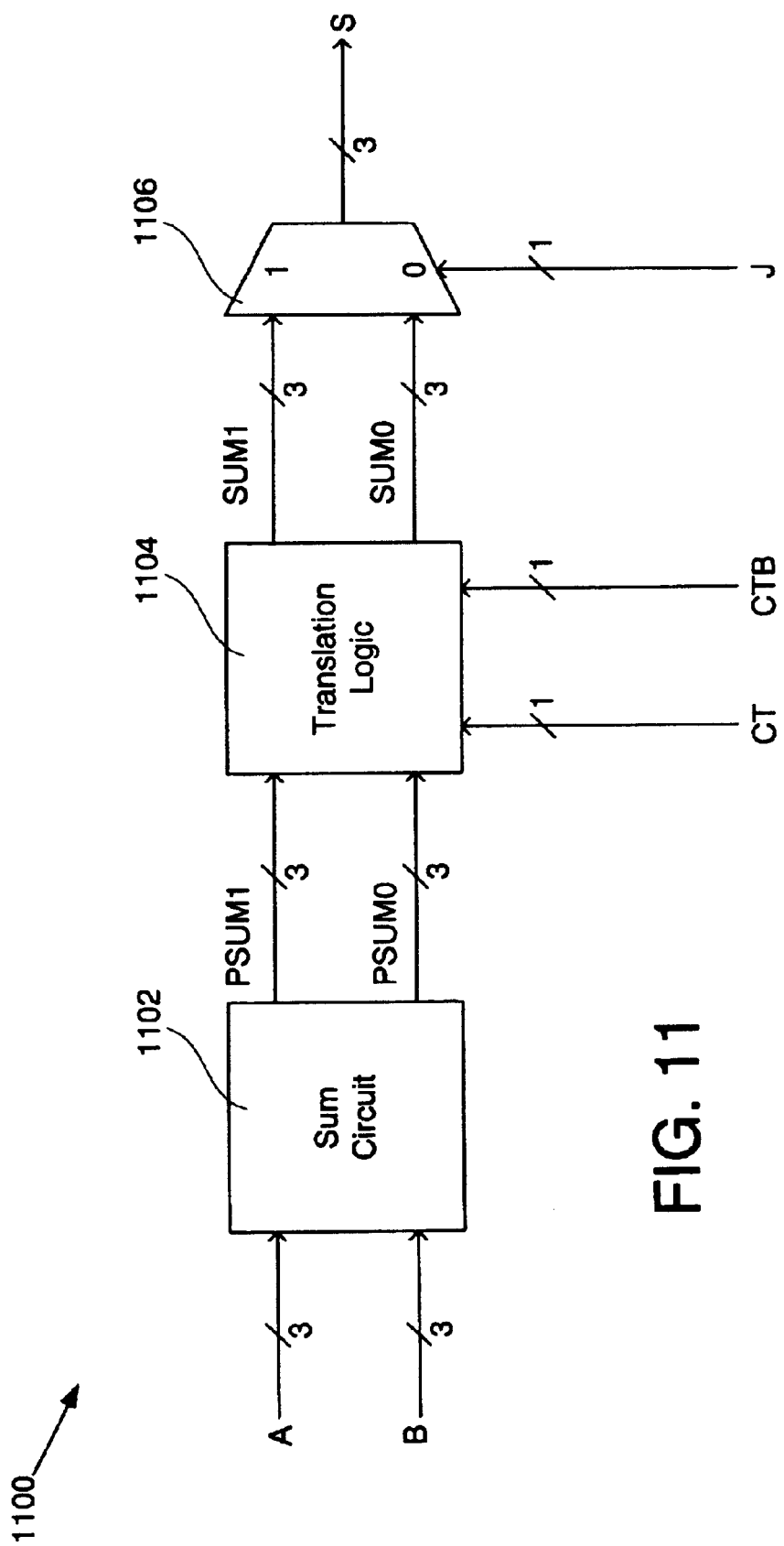
FIG. 11 is a block diagram of one embodiment of a sum generator of the adder of FIG. 6.

FIG. 11 shows a sum generator 1100 that is one embodiment of sum generator 602 of FIG. 6. Sum generator 1100 includes a sum circuit 1102, translation logic 1104, and a MUX 1106. Sum circuit 1102 adds 3 corresponding bits of input signals A and B to generate 3-bit pre-sum signals PSUM1 and PSUM0, where PSUM1 assumes a logic high carry-in bit and PSUM0 assumes a logic low carry-in bit. Sum circuit 1102 is well-known, and may include two 3-bit carry-ripple adders to generate PSUM1 and PSUM0. For one embodiment, sum circuit 1102 may include the configuration of full adders 502a–503c and 504a–504c of prior art sum circuit 500 of FIG. 5, where the sum1 and sum0 signals of FIG. 5 correspond to the PSUM1 and PSUM0 signals, respectively, of FIG. 11.

Signals PSUM1 and PSUM0 are provided to translation logic 1104, which in turn uses the corresponding carry translation signal CT to convert pre-sum signals PSUM1 and PSUM0 into sum signals SUM1 and SUM0, respectively. For one embodiment, translation circuit 1104 generates SUM1 according to the logical expression SUM1= PSUM1|CT and generates SUM0 according to the logical expression SUM0=PSUM0|CTB, where CTB is formed by logically complementing the input signals to the T2 circuits 850, i.e., CTB[A, B]=CT[$\overline{A}$, $\overline{B}$]. Thus, for example, CTB [y→x]=($\overline{Ay}$+$\overline{By}$)|($\overline{Ax}$+$\overline{Bx}$)+$\overline{Ay}$|$\overline{By}$. Signals SUM1 and SUM0 are provided as inputs to MUX 1106 which, in response to the J signal, selects either SUM1 or SUM0 to output as sum bits S. In this manner, translation logic 1104 and MUX 1106 generate each sum bit from its corresponding pre-sum bit according to the logical expression S=J|CT|PSUM1+JB|CTB|PSUM0.

Each of the secondary accumulated carry-create signals JB[11→0], JB[8→0], JB[5→0], and JB[2→0] may be generated in a manner similar to that described above with respect to corresponding accumulated carry-create signals J[11→0], J[8→0], J[5→0], and J[2→0] where the A and B input signals are complemented before generating corresponding carry-create signals J[z→x] and carry-transmit signals T[z→x]. For example, CLA block 910 may generate JB[5→0] in response to JB[5→3], JB[2→0], and TB[3→1], where JB[5→3]=$\overline{A_5}$|$\overline{B_5}$+$\overline{A_4}$|$\overline{B_4}$+$\overline{A_3}$|$\overline{B_3}$, JB[2→0]=$\overline{A_2}$|$\overline{B_2}$+$\overline{A_1}$| $\overline{B_1}$+$\overline{A_0}$+$\overline{B_0}$, and TB[3→1]=($\overline{A_3}$+$\overline{B_3}$)|[($\overline{A_2}$+$\overline{B_2}$)|($\overline{A_1}$+$\overline{B_1}$)+($\overline{A_2}$ $\overline{B_2}$)]. In this manner, JB|CTB is the logical complement of J|CT. Note that where sum generator 1100 is used as sum generator 602a of FIG. 6, the CT and J signals may be grounded so that SUM0 is selected to provide sum bits S[2:0].

FIG. 12 shows one embodiment 1200 of a dynamic logic implementation of translation circuit 1104 and MUX 1106 of sum generator 1100 of FIG. 11. Circuit 1200 includes a PMOS pull-up transistor 1201 coupled between $V_{DD}$ and the output at which the sum bit S is provided. Circuit 1200 also includes NMOS pull-down transistors 1206–1207 connected in series between the output and ground potential, and NMOS pull-down transistors 1208–1209 connected in series between the output and ground potential. Signal J is provided to the gate of transistor 1206, and signal JB is provided to the gate of transistor 1028. Signals PSUM1 and CT are logically combined in logic gate 1210 and provided to the gate of transistor 1207 as SUM1, and signals PSUM0 and CTB are logically combined in logic gate 1211 and provided to the gate of transistor 1209 as SUM0. Clock (CLK) and an enable signal (EN) are logically combined in NAND gate 1202 and provided to the gate of transistor 1201 via delay elements 1203–1205 to pull the output to logic high when CLK is in a logic low state. When CLK is logic high, the logic state of S is determined by signals J, JB, CT, CTB, PSUM1, and PSUM0. Delay elements 1203–1205 provide buffering and delay matching, and may be eliminated in some embodiments.

It will be appreciated that other circuit configurations may be used to implement the logic functions of sum generator 1100. For example, in other embodiments, carry translation signals CT may be logically ANDed with corresponding accumulated carry-create signals J to generate well-known accumulated carry-generate signals G, which in turn may be supplied to a conventional sum circuit (e.g., sum circuit 500 of FIG. 5) to select between sum1 and sum0 bits. However, it is to be appreciated that the implementation shown in FIG. 11 does not introduce additional delay in generating the sum bits as compared to prior art sum circuits. Specifically, because translation logic 1104 provides the SUM1 and SUM0 signals before J is generated by CLA logic 900 (see also FIG. 6), the gate delays associated with carry-ripple adders in sum circuit 1102 and logic in translation logic 1104 are overlapped with gate delays associated in generating J, and therefore do not affect the performance of adder 600. In contrast, embodiments that combine the carry translation and accumulated carry-create signals to produce accumulated carry-generate signals introduce additional delay into the critical path of J, and are therefore less desirable.

Figure 2:
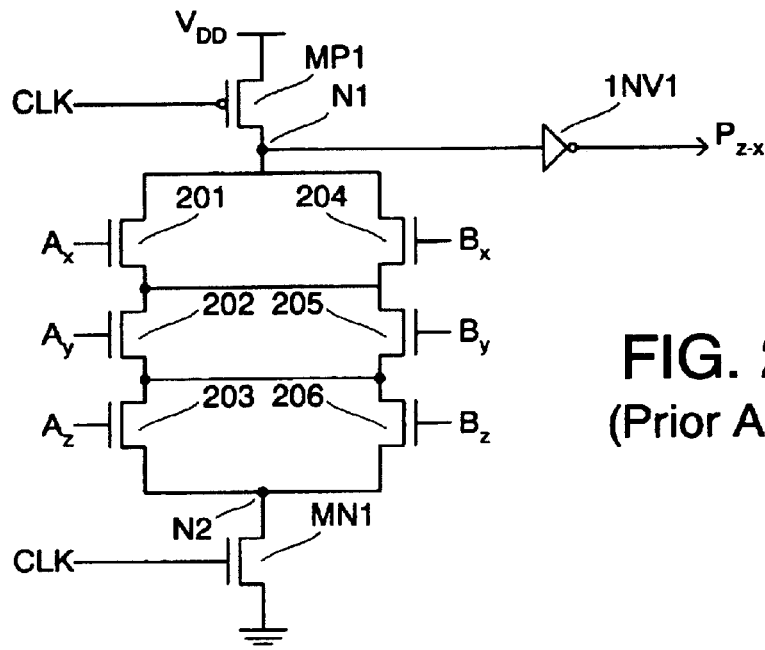
FIG. 2 is a circuit diagram of a conventional 3-bit carry-propagate circuit of the adder of FIG. 1.
Figure 3:
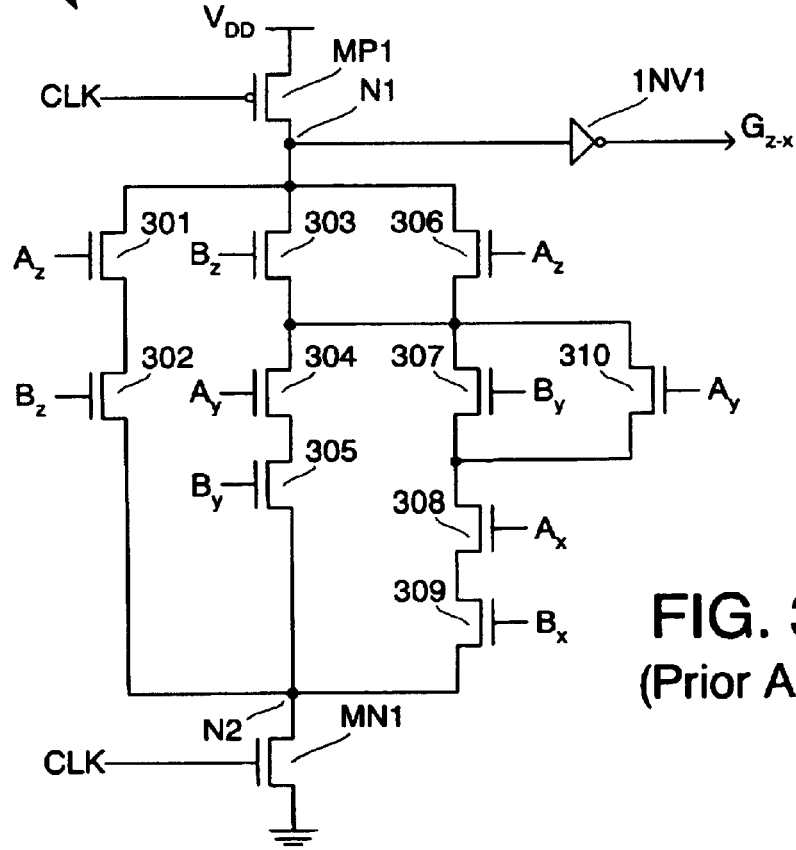
FIG. 3 is a circuit diagram of a conventional 3-bit carry-generate circuit of the adder of FIG. 1.
Figure 4A:
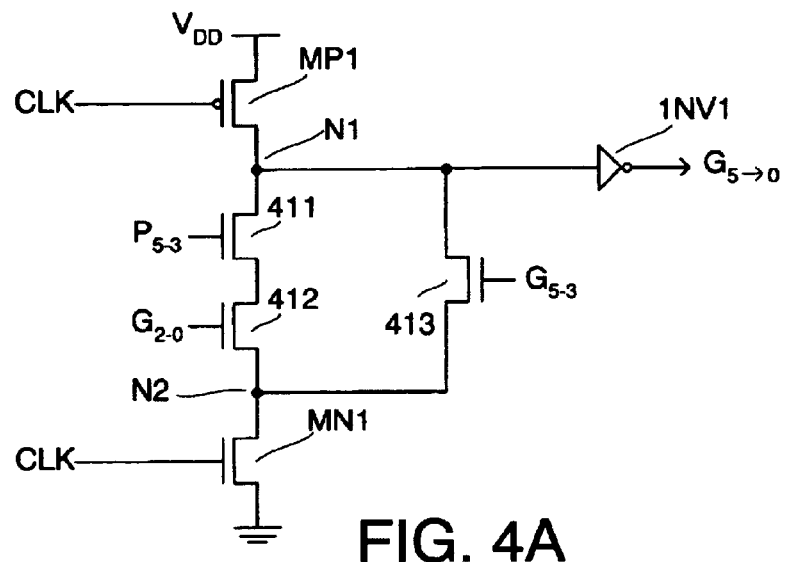
FIGS. 4A–4C are circuit diagrams of conventional CLA blocks of the adder of FIG. 1.
Figure 4B:
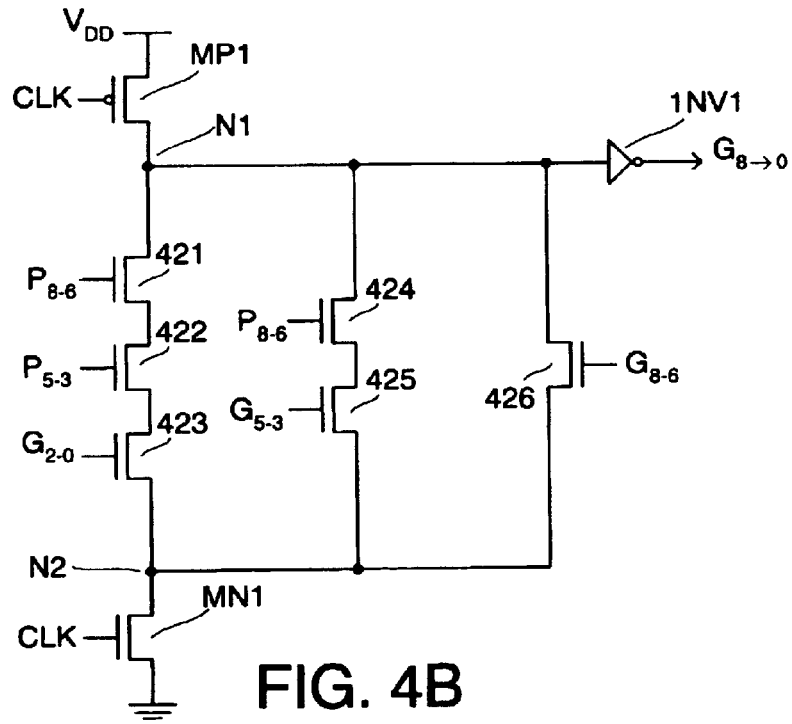
Figure 4C:
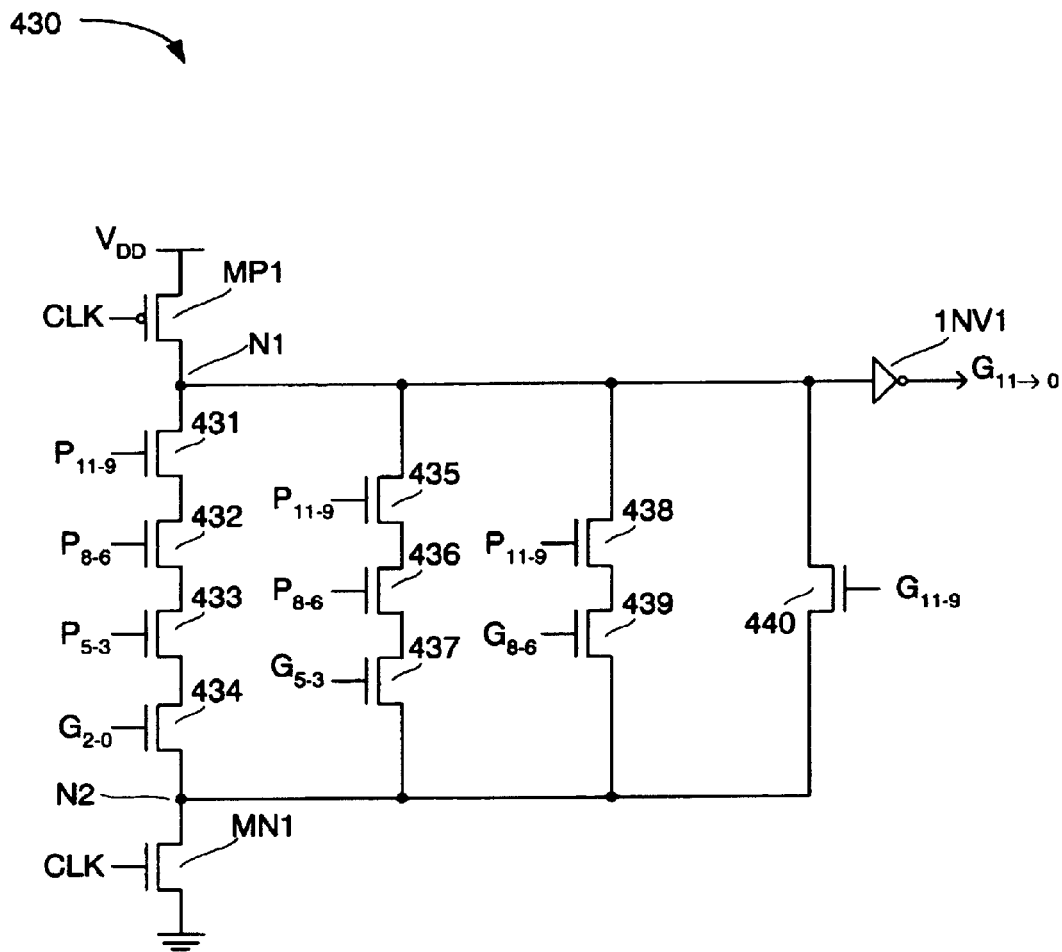

As discussed above, adder 600 may be faster than conventional CLA adders such as, for example, adder 100 of FIG. 1, because the first stage logic circuits (e.g., J3 circuit 700 and T3 circuit 800) of adder 600 have lower stack heights than first stage logic circuits (e.g., P3 circuit 200 and G3 circuit 300) of conventional CLA adders. Referring again to FIGS. 7 and 8, each discharge path of J3 circuit 700 includes two stacked input transistors coupled between nodes N1 and N2, and thus J3 circuit 700 has a stack height of two, and each discharge path of T3 circuit 800 includes three stacked input transistors coupled between nodes N1 and N2, and thus T3 circuit 800 has a stack height of three. In contrast, prior art P3 circuit 200 of FIG. 2 has a stack height of three, and prior art G3 circuit 300 of FIG. 3 has a stack height of four. Accordingly, because the first stage carry-create and carry-transmit circuits of present embodiments have lower stack heights than prior art first stage carry-propagate and carry-generate circuits, respectively, adders configured in accordance with the present invention may be faster than conventional CLA adders that employ prior art carry-propagate and carry-generate logic circuits.

Further, in contrast to the prior art, Applicant's first stage logic circuits have evenly balanced discharge paths. Referring again to FIGS. 7 and 8, each discharge path in J3 carry-create circuit 700 includes two stacked input transistors, and each discharge path in T3 circuit 800 includes three stacked input transistors. By comparison, prior art carry-generate circuit 300 of FIG. 3 includes one discharge path having four stacked input transistors, a second discharge path having three stacked input transistors, and a third discharge path having two stacked input transistors, and therefore, as discussed above, requires re-sizing of its input transistors to maintain balanced operation. Thus, because Applicant's carry-create circuit 700 and carry-transmit circuit 800 each have balanced discharge paths, transistor sizing modifications that compensate for different drive strengths are not necessary.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of generating carry information during an arithmetic operation of a first input signal A and second input signal B, the method comprising:

generating a plurality of carry-create signals in response to logical combinations of corresponding first groups of bit pairings of the first and second input signals;

generating a plurality of carry-transmit signals in response to logical combinations of corresponding second groups of bit pairings of the first and second input signals, wherein the first groups of bit pairings are different from the second groups of bit pairings; and logically combining the carry-create and carry-transmit signals to create a number of accumulated carry-create signals that represent accumulated carry information at predetermined bit intervals, wherein each carry-create signal is generated according to the logical expression $J[z \rightarrow x] = (Az|Bz) + (Ay|By) + (Ax|Bx)$, where $|$ is the logical AND operation and $+$ is the logical OR operation, and x, y, and z represent consecutive bit positions of the input signals.

2. The method of claim 1, wherein each carry-transmit signal is generated according to the logic expression $T[z \rightarrow x] = (Az+Bz)|[(Ay+By)|(Ax+Bx)+(Ay|By)]$, where $|$ is the logical AND operation and $+$ is the logical OR operation, and x, y, and z represent consecutive bit positions of the input signals.

3. The method of claim 1, wherein the logically combining step is implemented using carry look-ahead logic.

4. The method of claim 1, further comprising:

generating a number of carry translation signals in response to logical combinations of corresponding third groups of bit pairings of the first and second input signals;

generating a number of pairs of complementary pre-sum signals in response to a logical addition of the input signals;

logically combining the carry translation signals with corresponding pairs of complementary pre-sum signals to generate a number of pairs of complementary sum signals; and selecting one from each pair of complementary sum signals in response to corresponding accumulated carry-create signals to generate a sum signal.

5. The method of claim 4, wherein each carry translation signal is generated according to the logical expression $CT[y \rightarrow x] = (Ay+By)|(Ax+Bx)+(Ay|By)$, where $|$ is the logical AND operation and $+$ is the logical OR operation, and x and y represent consecutive bit positions of the input signals.

6. The method of claim 1, further comprising:

generating a number of carry translation signals in response to logical combinations of corresponding third groups of bit pairings of the first and second input signals;

logically combining each of the carry translation signals with a corresponding accumulated carry-create signal to generate a number of accumulated carry-generate signals;

generating a number of pairs of complementary sum signals in response to a logical addition of the input signals; and selecting one from each pair of complementary sum signals in response to corresponding accumulated carry-create signals to generate a sum signal.

7. An adder for generating carry information during an arithmetic operation of a first input signal A and second input signal B, comprising:

means for generating a plurality of carry-create signals in response to corresponding first groups of bit pairings of the first and second input signals;

means for generating a plurality of carry-transmit signals in response to corresponding second groups of bit pairings of the first and second input signals, wherein the first groups of bit pairings are different from the second groups of bit pairings;

means for logically combining the carry-create and carry-transmit signals to create a number of accumulated carry-create signals that represent accumulated carry information at predetermined bit intervals, wherein the means for generating the carry-transmit signal comprises a logic circuit configured to implement the logical expression $T[z \rightarrow x] = (Az+Bz)|[(Ay+By)|(Ax+Bx)+(Ay|By)]$, where $|$ is the logical AND operation and $+$ is the logical OR operation, and x, y, and z represent consecutive bit positions of the input signals.

8. The adder of claim 7, wherein the means for generating the carry-create signal has a stack height of two.

9. The adder of claim 7, wherein the means for generating the carry-create signal comprises a logic circuit configured to implement the logical expression $J[z \rightarrow x] = (Az|Bz) + (Ay|By) + (Ax|Bx)$, where $|$ is the logical AND operation and $+$ is the logical OR operation, and x, y, and z represent consecutive bit positions of the input signals.

10. The adder of claim 7, wherein the means for generating the carry-transmit signal has a stack height of three.

11. The adder of claim 7, wherein the means for combining comprises carry look-ahead logic.

12. The adder of claim 7, further comprising:

means for generating a number of carry translation signals in response to logical combinations of corresponding third groups of bit pairings of the first and second input signals;

means for generating a number of pairs of complementary pre-sum signals in response to a logical addition of the input signals;

means for logically combining the carry translation signals with corresponding pairs of complementary pre-sum signals to generate a number of pairs of complementary sum signals; and means for selecting one from each pair of complementary sum signals in response to corresponding accumulated carry-create signals to generate a sum signal.

13. The adder of claim 12, wherein the means for generating the carry translation signal comprises a logic circuit configured to implement the logical expression $CT[y \rightarrow x] = (Ay+By)|(Ax+Bx)+(Ay|By)$, where $|$ is the logical AND operation and $+$ is the logical OR operation, and $x$ and $y$ represent consecutive bit positions of the input signals.

14. The adder of claim 7, further comprising:

means for generating a number of carry translation signals in response to logical combinations of corresponding third groups of bit pairings of the first and second input signals;

means for logically combining each of the carry translation signals with a corresponding accumulated carry-create signal to generate a number of accumulated carry-generate signals;

means for generating a number of pairs of complementary sum signals in response to a logical addition of the input signals; and means for selecting one from each pair of complementary sum signals in response to corresponding accumulated carry-create signals to generate a sum signal.

15. An adder for generating carry information during an arithmetic operation of a first input signal A and second input signal B, comprising:

a plurality of carry-create circuits, each for generating a carry-create signal J in response to corresponding bit pairings of the input signals according to the logical expression $J[z \rightarrow x] = (Az|Bz)+(Ay|By)+(Ax|BX)$, where $|$ is the logical AND operation, $+$ is the logical OR operation, and $x$, $y$, and $z$ represent consecutive bit positions of the input signals;

a plurality of carry-transmit circuits, each for generating a carry-transmit signal T in response to corresponding bit pairings of the input signals according to the logical expression $T[z \rightarrow x] = (Az+Bz)|[(Ay+By)|(Ax+Bx)+(Ay|By)]$; and carry look-ahead logic for logically combining the carry-create signals and the carry-transmit signals to generate a number of accumulated carry-create signals that represent accumulated carry information at predetermined bit intervals.

16. The adder of claim 15, further comprising:

a plurality of carry translation circuits, each for generating a carry translate slate signal CT in response to corresponding bit pairings of the input signals according to the logical expression $CT[y \rightarrow x] = (Ay+By)|(Ax+Bx)+(Ay|By)$.

17. The adder of claim 16, where the carry-translate circuit is incorporated within the carry-transmit circuit.

18. The adder of claim 16, further including a number of sum generators, each comprising:

a sum circuit for generating pairs of complementary pre-sum bits in response to logical additions of corresponding bits of the input-signals;

translation logic having inputs to receive the pairs of complementary pre-sum signals, an input to receive a corresponding carry-translation signal, and outputs to provide pairs of complementary sum bits; and a multiplexer having inputs to receive the pairs of complementary s bits, a select terminal to receive a corresponding accumulated carry-create signal, and an output to provide corresponding bits of a sum signal.

19. The adder the of claim 18, wherein translation logic translates pairs of complementary pre-sum bits into corresponding pairs of complementary sum bits.

20. The adder of claim 18, wherein each sum generator generates the sum bits S [5:3] according to the logical expression $S\ [5:3] = J\ [2 \rightarrow 0] | CT\ [2 \rightarrow 1] | SUM1\ [5:3] + JB\ [2 \rightarrow 0] | CTB[2 \rightarrow 1] | SUM0[5:3]$ where $JB[2 \rightarrow 0] = \overline{A_2|B_2 + A_1|B_1 + A_0 + B_0}$, $CTB\ [2 \rightarrow 1] = \overline{(A_2+B_2)|(A_1+B_1) + A_2|B_2}$, and SUM1 [5:3] and SUM0 [5:3] are pairs of complementary sum bits.

21. The adder of claim 15 wherein each carry-create circuit has a stack height of two.

22. The adder of claim 15, wherein each carry-create circuit comprises:

first and second transistors connected in series between an output and a first node, the first transistor responsive to Ax, the second transistor responsive to Bx;

third and fourth transistors connected in series between the output and the first node, the third transistor responsive to Ay, the fourth transistor responsive to By; and fifth and sixth transistors connected in series between the output and first node, the fifth transistor responsive to Az, the sixth transistor responsive to Bz.

23. The adder of claim 15, wherein each carry-create circuit further comprises:

a PMOS pull-up transistor coupled between a supply voltage and the output, the pull-up transistor responsive to a clock signal; and an NMOS pull-down transistor coupled between the first node and potential, the pull-down transistor responsive to a complement of the clock signal.

24. The adder of claim 15, wherein each carry-transmit circuit has a stack height of three.

25. The adder of claim 15, wherein each carry-transmit circuit comprises:

first and second transistors connected in parallel between an output and a first node, the first transistor responsive to Az, the second transistor responsive to Bz;

third and fourth transistors connected in series between the first node and a second node, the third transistor responsive to Ay, the fourth transistor responsive to By;

fifth and sixth transistors connected in parallel between the first node and a third node, the fifth transistor responsive to Ay, the sixth transistor responsive to By; and seventh and eighth transistors connected in parallel between the third node and the second node, the sixth transistor responsive to Ax, the seventh transistor responsive to Bx.

26. The adder of claim 15, wherein each carry-transmit circuit further comprises:

a PMOS pull-up transistor coupled between a supply voltage and the output, the pull-up transistor responsive to a clock signal; and an NMOS pull-down transistor coupled between the second node and ground potential, the pull-down transistor responsive to a complement of the clock signal.

* * * * *